United States Patent
Park et al.

(10) Patent No.: US 11,184,908 B2
(45) Date of Patent: Nov. 23, 2021

(54) METHOD AND DEVICE FOR TRANSMITTING/RECEIVING RADIO SIGNAL IN WIRELESS COMMUNICATION SYSTEM

(71) Applicant: LG Electronics Inc., Seoul (KR)

(72) Inventors: Changhwan Park, Seoul (KR); Seonwook Kim, Seoul (KR); Seokmin Shin, Seoul (KR); Joonkui Ahn, Seoul (KR); Suckchel Yang, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 96 days.

(21) Appl. No.: 16/638,032

(22) PCT Filed: Aug. 10, 2018

(86) PCT No.: PCT/KR2018/009221
§ 371 (c)(1),
(2) Date: Feb. 10, 2020

(87) PCT Pub. No.: WO2019/031936
PCT Pub. Date: Feb. 14, 2019

(65) Prior Publication Data
US 2020/0221481 A1    Jul. 9, 2020

Related U.S. Application Data

(60) Provisional application No. 62/543,936, filed on Aug. 10, 2017.

(51) Int. Cl.
*H04W 72/12*        (2009.01)
*H04W 4/80*         (2018.01)
(Continued)

(52) U.S. Cl.
CPC ......... *H04W 72/1273* (2013.01); *H04W 4/80* (2018.02); *H04W 72/0466* (2013.01); *H04W 72/0473* (2013.01)

(58) Field of Classification Search
CPC .............. H04W 72/1273; H04W 4/80; H04W 72/0466; H04W 72/0473; H04W 4/70; H04L 27/2602; H04L 5/003; H04L 5/0048
See application file for complete search history.

(56) References Cited

U.S. PATENT DOCUMENTS

2015/0124663 A1*  5/2015  Chen ................... H04L 1/0023
                                                        370/278
2016/0197687 A1*  7/2016  Song ................ H04W 72/0446
                                                        370/252

FOREIGN PATENT DOCUMENTS

WO    WO2017014558       1/2017

OTHER PUBLICATIONS

Huawei, HiSilicon, "Dynamic and semi-static DL/UL resource partition," R1-1706913, 3GPP TSG RAN WG1 Meeting #89, 3GPP TSG RAN WG1 Meeting #89, dated May 15-19, 2017, 4 pages.
(Continued)

*Primary Examiner* — Asghar H Bilgrami
(74) *Attorney, Agent, or Firm* — Fish & Richardson P.C.

(57) ABSTRACT

The present invention relates to a wireless communication system, and specifically, to a method and a device therefor, the method comprising the steps of: repeatedly receiving a PDCCH including scheduling information, wherein the scheduling information includes time delay information; and repeatedly transmitting a PUSCH indicated by the scheduling information, after a time point indicated by the time delay information from the time point when the repeated receiving of the PDCCH ends, wherein a time resource in a time region includes a fixed DL time unit having a trans-
(Continued)

mission direction fixed to a DL, and a time resource includes a fixed uplink (UL) time unit having a transmission direction fixed to a UL, and a floating time unit having a variable transmission direction, and the time point indicated by the time delay information is calculated on the basis of the fixed UL time unit.

12 Claims, 13 Drawing Sheets

(51) Int. Cl.
    *H04W 72/04*      (2009.01)
    *H04W 4/02*      (2018.01)
    *H04W 4/70*      (2018.01)
    *H04L 27/26*      (2006.01)
    *H04L 5/00*      (2006.01)

(56) References Cited

OTHER PUBLICATIONS

LG Electronics, "SPS support in NB-IoT," R1-1707573, 3GPP TSG RAN WG1 Meeting #89, Hangzhou, P.R. China, dated May 15-19, 2017, 3 pages.

Nokia, Alcatel-Lucent Shanghai Bell, "Multiple starting and ending positions in a subframe for UL," Rl-1708180, 3GPP TSG-RAN WG1 Meeting #89, Hangzhou, P.R. China, dated May 15-19, 2017, 3 pages.

Nokia, Alcatel-Lucent Shanghai Bell, "On PUSCH resource allocation and scheduling timing in NR," R1-1708523, 3GPP TSG RAN WG1#89, Hangzhou, P.R. China, dated May 15-19, 2017, 5 pages.

PCT International Search Report and Written Opinion in International Application No. PCT/KR2018/009221, dated Dec. 6, 2018, 18 pages (with English translation).

\* cited by examiner

METHOD AND DEVICE FOR TRANSMITTING/RECEIVING RADIO SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2018/009221, filed Aug. 10, 2018, which claims the benefit of U.S. Provisional Application No. 62/543,936, filed on Aug. 10, 2017. The disclosures of the prior applications are incorporated by reference in their entirety.

TECHNICAL FIELD

The present disclosure relates to a wireless communication system, and more particularly, to a method and apparatus for transmitting/receiving a wireless signal. The wireless communication system includes a narrowband Internet of things (NB-IoT)-based wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An aspect of the present disclosure is to provide a method and apparatus for efficiently transmitting/receiving a wireless signal.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of transmitting a signal by a user equipment (UE) in a wireless communication system includes repeatedly receiving a physical downlink control channel (PDCCH) including scheduling information, the scheduling information including time delay information, and repeatedly transmitting a physical uplink shared channel (PUSCH) indicated by the scheduling information after a time point indicated by the time delay information from an ending time of the repeated receptions of the PDCCH. Time resources in a time domain include a fixed downlink (DL) time unit with a transmission direction fixed to DL, a fixed uplink (UL) time unit with a transmission direction fixed to UL, and a floating time unit with a flexible transmission direction, and the time point indicated by the time delay information is calculated based on the fixed UL time unit.

In another aspect of the present disclosure, a UE used in a wireless communication system includes a radio frequency (RF) module and a processor. The processor is configured to repeatedly receive a PDCCH including scheduling information, the scheduling information including time delay information, and repeatedly transmit a PUSCH indicated by the scheduling information after a time point indicated by the time delay information from an ending time of the repeated receptions of the PDCCH. Time resources in a time domain include a fixed DL time unit with a transmission direction fixed to DL, a fixed UL time unit with a transmission direction fixed to UL, and a floating time unit with a flexible transmission direction, and the time point indicated by the time delay information is calculated based on the fixed UL time unit.

Based on the repeated transmissions of the PUSCH being scheduled to be transmitted across a fixed UL time unit set and a floating UL time unit set, the repeated transmissions of the PUSCH may be performed only in the fixed UL time unit set based on a difference between transmission power of the fixed time unit and transmission power of the floating UL time unit being larger than a predetermined value.

Based on the repeated transmissions of the PUSCH being scheduled to be transmitted across a fixed UL time unit set and a floating UL time unit set, a scrambling sequence used for the repeated transmissions of the PUSCH may be initialized at a boundary between the fixed UL time unit set and the floating UL time unit set.

Based on the repeated transmissions of the PUSCH being scheduled to be transmitted across a fixed UL time unit set and a floating UL time unit set, a scrambling sequence may be initialized every N PUSCH transmissions in the fixed UL time unit set and every M PUSCH transmissions in the floating UL time unit set, and N and M may be different.

Transmission power of the fixed UL time unit may be greater than transmission power of the floating UL time unit, and N may be less than M.

The PDCCH may include a narrowband PDCCH (NPDCCH), and the PUSCH may include a narrowband PUCCH (NPUCCH).

The wireless communication system may include a wireless communication system supporting narrowband Internet of things (NB-IoT).

Advantageous Effects

According to the present disclosure, wireless signal transmission and reception can be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application.

BEST MODE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present disclosure.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
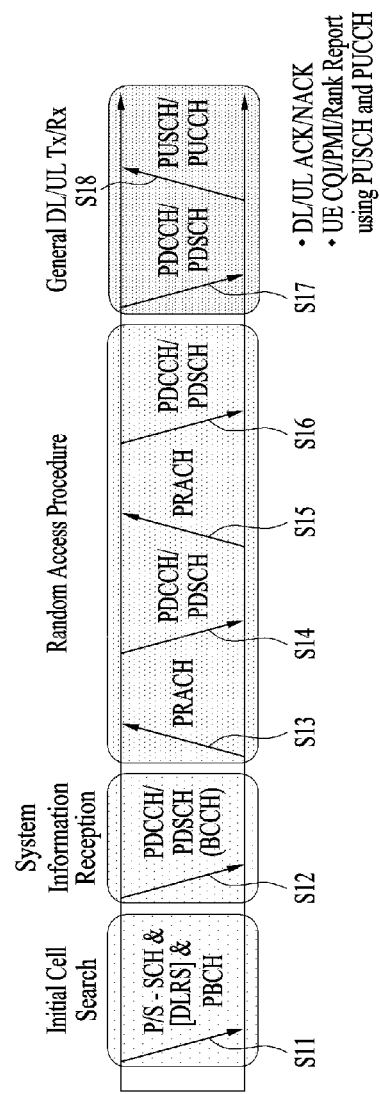
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
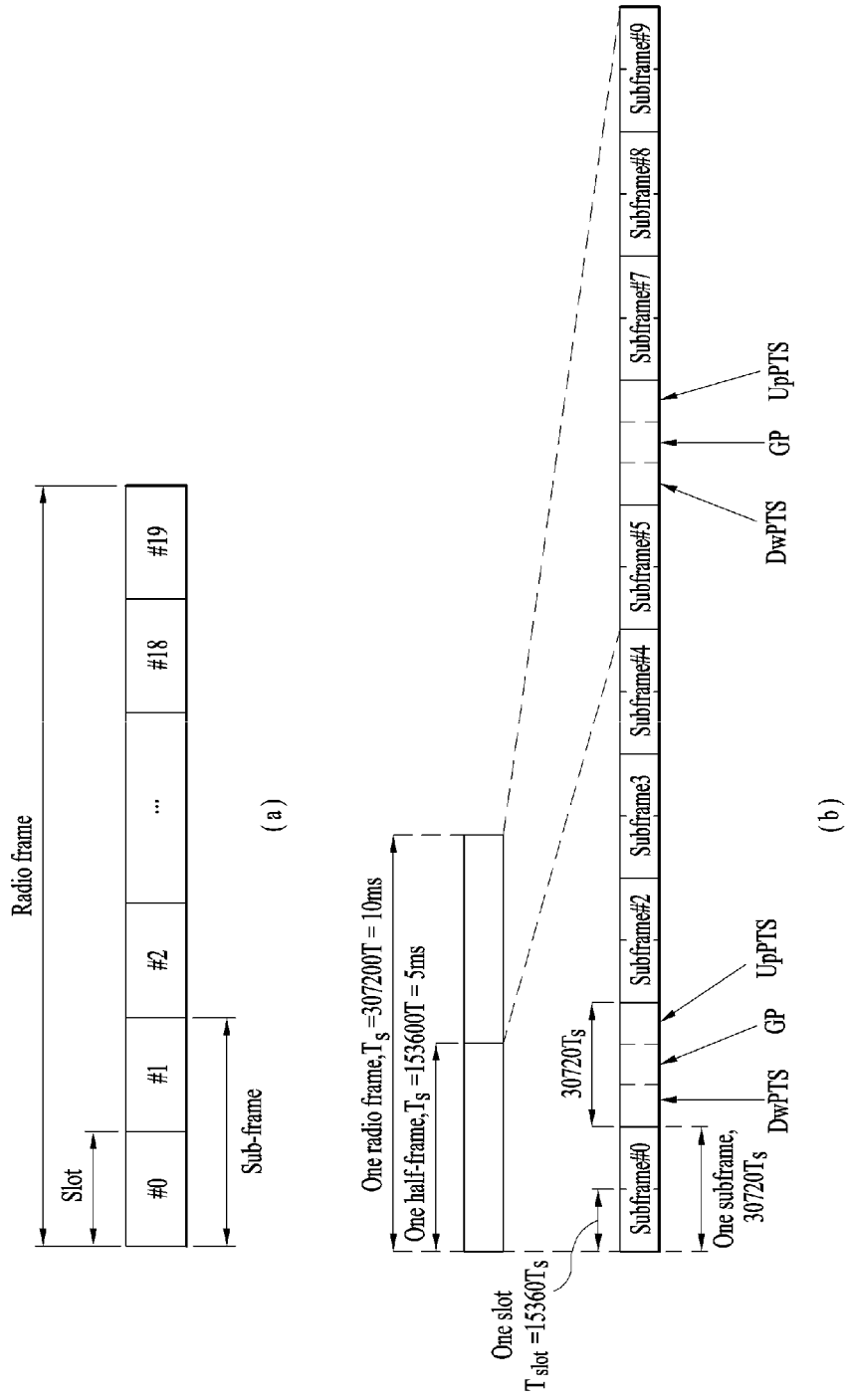
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(*a*) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
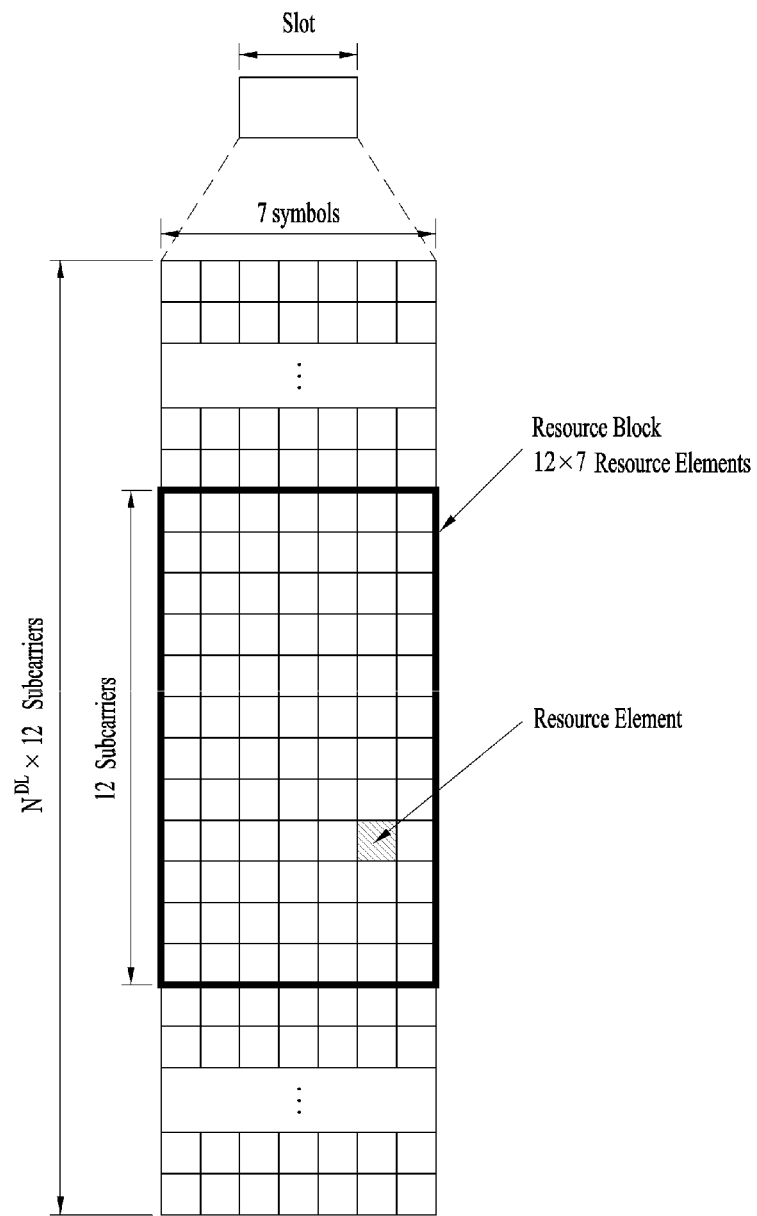
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present disclosure is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
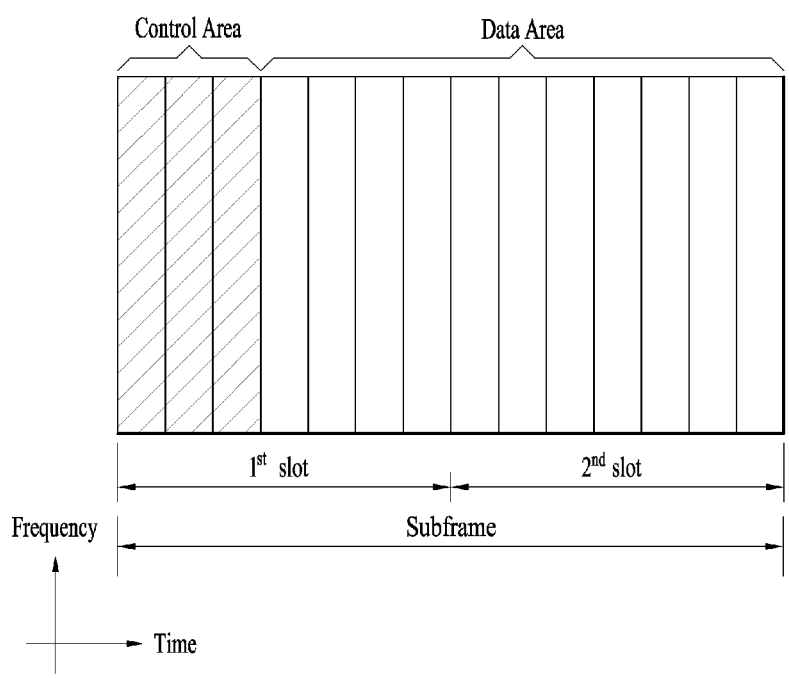
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries a HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (port5) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/i-bit power adjustments FIG. 5 illustrates a structure of an uplink subframe used in LTE(-A).

Figure 5:
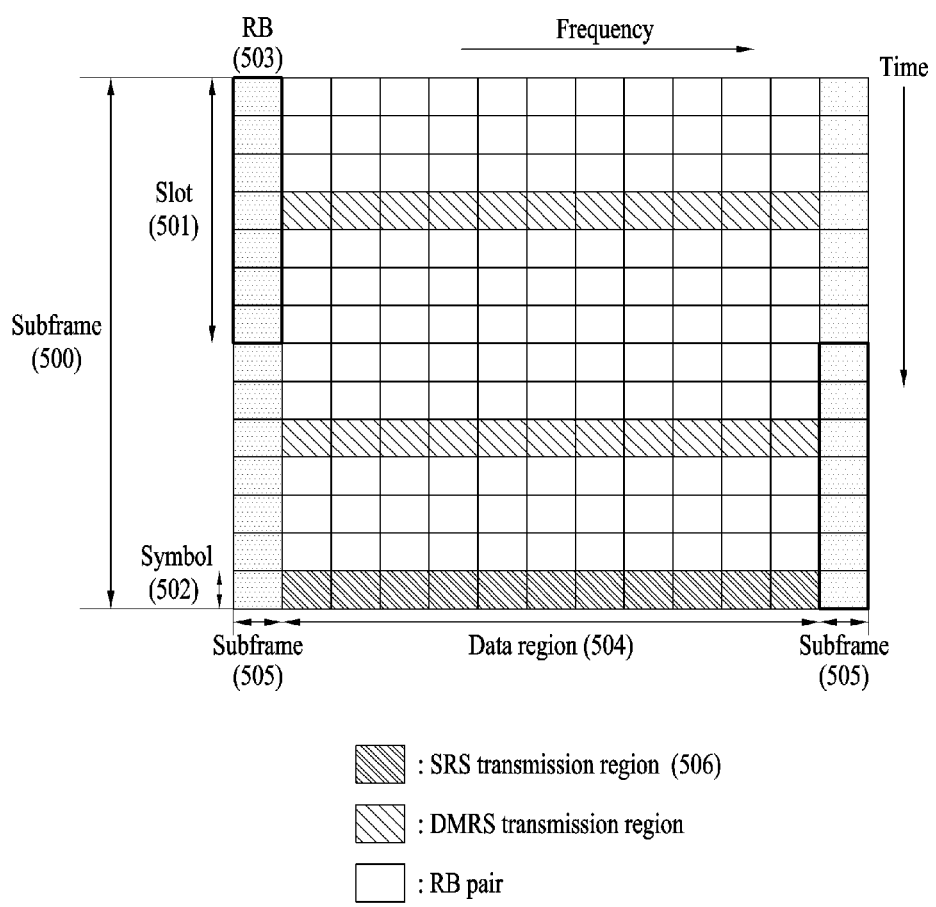
FIG. 5 illustrates the structure of an uplink subframe used in LTE(-A).

Referring to FIG. 5, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

Figure 6:
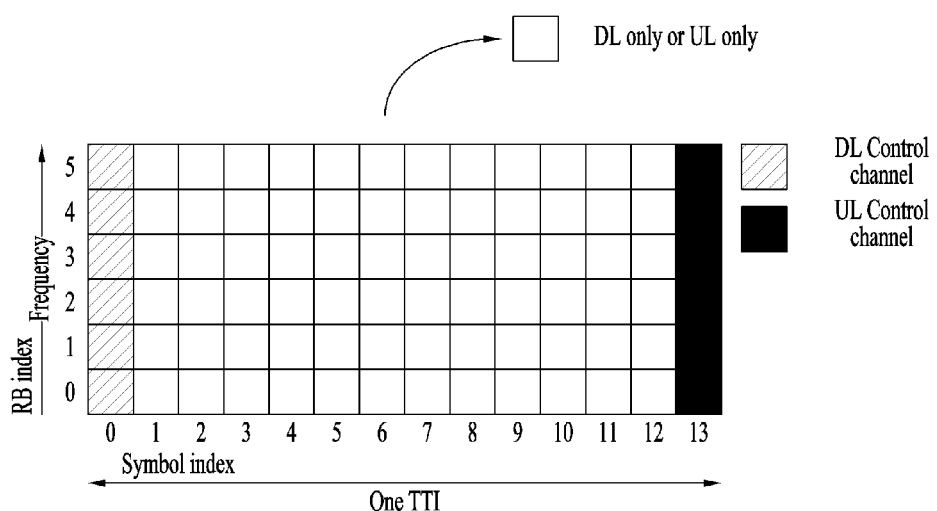
FIG. 6 is a diagram illustrating a self-contained subframe structure.

To minimize data transmission latency, a self-contained subframe is considered in the next-generation radio access technology (RAT). FIG. 6 illustrates an exemplary self-contained subframe structure. In FIG. 6, the hatched area represents a DL control region, and the black area represents a UL control region. The area having no marks may be used for either DL data transmission or UL data transmission. In this structure, DL transmission and UL transmission are sequentially performed in one subframe to transmit DL data and receive a UL ACK/NACK for the DL data in the subframe. As a result, the resulting reduction of a time taken to retransmit data when a data transmission error occurs may lead to minimization of the latency of a final data transmission.

At least the following four subframe types may be considered as exemplary self-contained subframe types. Periods are enumerated in time order.

DL control period+DL data period+guard period (GP)+UL control period

DL control period+DL data period

DL control period+GP+UL data period+UL control period

DL control period+GP+UL data period

A PDFICH, a PHICH, and a PDCCH may be transmitted in the DL control period, and a PDSCH may be transmitted in the DL data period. A PUCCH may be transmitted in the UL control period, and a PUSCH may be transmitted in the UL data period. The GP provides a time gap for switching from a transmission mode to a reception mode or from the reception mode to the transmission mode at an eNB and a UE. Some OFDM symbol(s) at a DL-to-UL switching time may be configured as the GP.

In the environment of the 3GPP NR system, different OFDM numerologies, for example, different subcarrier spacings (SCSs) and hence different OFDM symbol (OS) durations may be configured between a plurality of cells aggregated for one UE. Accordingly, the (absolute time) duration of a time resource (e.g., SF, slot or TTI) (referred to as a time unit (TU) for convenience) including the same number of symbols may be set differently for the aggregated cells. Herein, the term symbol may cover OFDM symbol and SC-FDMA symbol.

Figure 7:
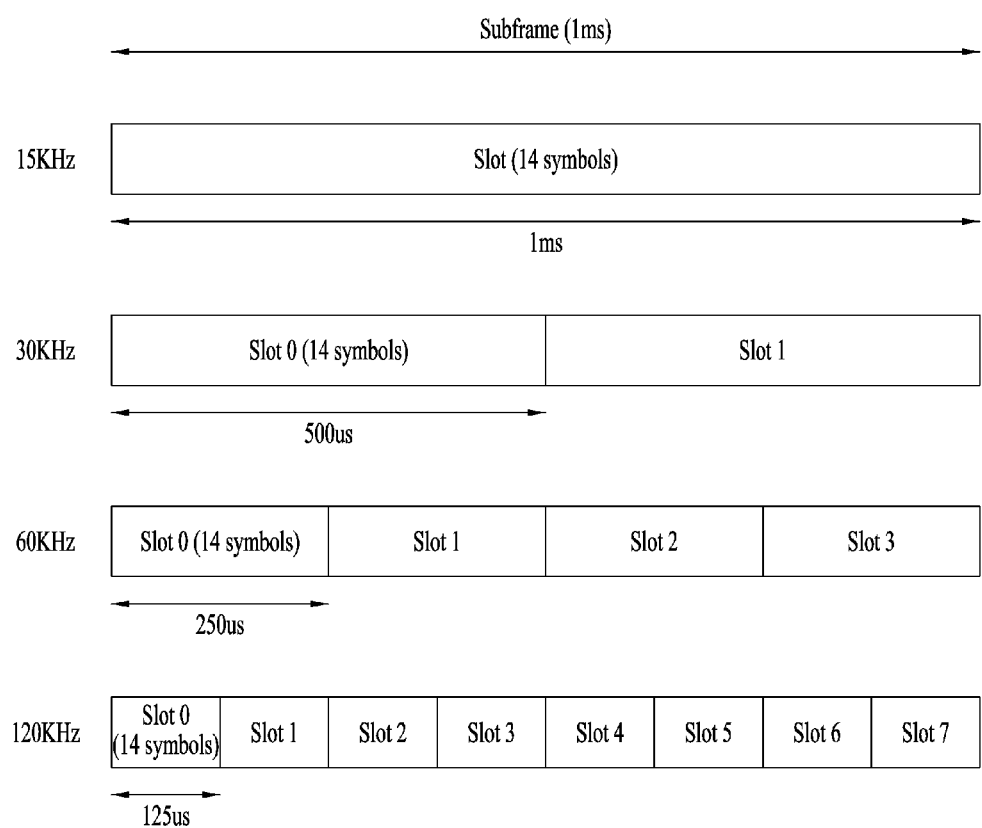
FIG. 7 is a diagram illustrating a frame structure defined for 3GPP new radio access technology (NR).

FIG. 7 illustrates a frame structure for 3GPP NR. In 3GPP NR, one radio frame includes 10 subframes each being 1 ms in duration, like a radio frame in LTE/LTE-A (see FIG. 2). One subframe includes one or more slots and the length of a slot varies with an SCS. 3GPP NR supports SCSs of 15 KHz, 30 KHz, 60 KHz, 120 KHz, and 240 KHz. A slot corresponds to a TTI of FIG. 6.

As noted from Table 4, the number of symbols per slot, the number of slots per frame, and the number of slots per subframe vary according to an SCS.

TABLE 4

| SCS (15*2^u) | Number of symbols per slot | Number of slots per frame | Number of slots per subframe |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

A description will be given of narrowband Internet of things (NB-IoT). While NB-IoT is described based on the 3GPP LTE standards for convenience, the following description is also applicable to the 3GPP NR standards. For this purpose, some technical configurations may be replaced with other ones in interpretation (e.g., LTE band→NR band and subframe→slot).

NB-IoT supports three operation modes: in-band mode, guard-band mode, and stand-alone mode. The same requirements apply to each mode.

(1) In-band mode: a part of the resources of the LTE band are allocated to NB-IoT.

(2) Guard-band mode: a guard frequency band of the LTE band is used, and an NB-IoT carrier is arranged as close as possible to an edge subcarrier of the LTE band.

(3) Stand-alone mode: some carriers in the GSM band are allocated to NB-IoT.

An NB-IoT UE searches for an anchor carrier in units of 100 kHz, for initial synchronization, and the center frequency of the anchor carrier should be located within +7.5 kHz from a 100-kHz channel raster in the in-band and guard-band. Further, the center 6 physical resource blocks (PRBs) of the LTE PRBs are not allocated to NB-IoT. Therefore, the anchor carrier may be located only in a specific PRB.

Figure 8:
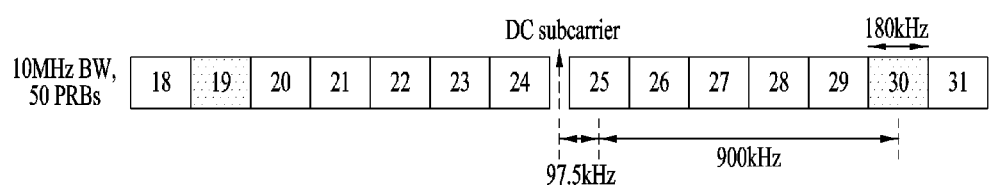
FIG. 8 is a diagram illustrating arrangement of an in-band anchor carrier for an LTE bandwidth of 10 MHz.

FIG. 8 is a diagram illustrating arrangement of an in-band anchor carrier in an LTE bandwidth of 10 MHz.

Referring to FIG. 8, a direct current (DC) subcarrier is located on a channel raster. Since the center frequency spacing between adjacent PRBs is 180 kHz, the center frequencies of PRBs 4, 9, 14, 19, 30, 35, 40 and 45 are located at +2.5 kHz from the channel raster. When the bandwidth is 20 MHz, the center frequency of a PRB suitable for transmission on the anchor carrier is located at +2.5 kHz from the channel raster, and when the bandwidth is 3 MHz, 5 MHz, or 15 MHz, the center frequency of a PRB suitable for transmission on the anchor carrier is located at +7.5 kHz from the channel raster.

In the guard-band mode, given bandwidths of 10 MHz and 20 MHz, the center frequency of a PRB immediately adjacent to an edge PRB of the LTE system is located at +2.5 kHz from the channel raster. Further, given bandwidths of 3 MHz, 5 MHz, and 15 MHz, a guard frequency band corresponding to three subcarriers from an edge PRB is used, and thus the center frequency of the anchor carrier may be located at +7.5 kHz from the channel raster.

In the stand-alone mode, an anchor carrier is aligned with the 100-kHz channel raster, and all GSM carriers including the DC carrier may be available as NB-IoT anchor carriers.

Further, NB-IoT may support multiple carriers, and a combination of in-band and in-band, a combination of in-band and guard-band, a combination of guard-band and guard-band, and a combination of stand-alone and stand-alone are available.

NB-IoT DL uses OFDMA with a 15-kHz SCS. OFDMA provides orthogonality between subcarriers, so that the NB-IoT system and the LTE system may coexist smoothly.

For NB-IoT DL, physical channels such as a narrowband physical broadcast channel (NPBCH), a narrowband physical downlink shared channel (NPDSCH), and a narrowband physical downlink control channel (NPDCCH) may be provided, and physical signals such as a narrowband primary synchronization signal (NPSS), a narrowband primary synchronization signal (NSSS), and a narrowband reference signal (NRS) are provided.

The NPBCH delivers minimum system information required for an NB-IoT UE to access the system, a master information block-narrowband (MIB-NB) to the NB-IoT UE. The NPBCH may be transmitted repeatedly eight times in total for coverage enhancement. The transport block size (TBS) of the MIB-NB is 34 bits and updated every TTI of 640 ms. The MIB-NB includes information about an operation mode, a system frame number (SFN), a hyper-SFN, the number of cell-specific reference signal (CRS) ports, and a channel raster offset.

The NPSS is composed of a Zadoff-Chu (ZC) sequence of length 11 and a root index of 5. The NPSS may be generated by the following equation.

$$d_l(n) = S(l) \cdot e^{-j\frac{\pi u n(n+1)}{11}}, n = 0, 1, \ldots, 10 \quad \text{Equation 1}$$

S(l) for symbol index l may be defined as illustrated in Table 5.

TABLE 5

| Cyclic prefix length S(3), ..., S(13) | | | | | | | | | | |
|---|---|---|---|---|---|---|---|---|---|---|
| Normal | 1 | 1 | 1 | 1 | −1 | −1 | 1 | 1 | 1 | −1 | 1 |

The NSSS is composed of a combination of a ZC sequence of length 131 and a binary scrambling sequence such as a Hadamard sequence. The NSSS indicates a PCID to NB-IoT UEs within the cell by the combination of sequences.

The NSSS may be generated by following equation.

$$d(n) = b_q(m)e^{-j2\pi\theta_f n}e^{-j\frac{\pi u n'(n'+1)}{131}} \quad \text{Equation 2}$$

Variables applied to Equation 2 may be defined as follows.

$$n = 0, 1, \ldots, 131 \quad \text{Equation 3}$$

$$n' = n \bmod 131$$

$$m = n \bmod 128$$

$$u = N_{ID}^{Ncell} \bmod 126 + 3$$

$$q = \left\lfloor \frac{N_{ID}^{Ncell}}{126} \right\rfloor$$

A binary sequence $b_q(m)$ may be defined as illustrated in Table 6, and $b_0(m)$ to $b_3(m)$ represent columns 1, 32, 64, and 128 of a Hadamard matrix of order 128. A cyclic shift $\theta_f$ for a frame number $n_f$ may be defined by Equation 4 below.

TABLE 6

| q | $b_q(0), \ldots b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 1 −1 −1 1 −1 1 1 −1 −1 1 1 −1 1 −1 −1 1 −1 1 1 −1 1 −1 −1 1 −1 1 1 −1 −1 1 1 −1 1 −1 −1 1 −1 1 1 −1 1 −1 −1 1 −1 1 1 −1 −1 1 1 −1 −1 1 1 −1 1 −1 −1 1 −1 1 1 −1 1 −1 −1 1 −1 1 1 −1 −1 1 1 −1 1 −1 −1 1 −1 1 1 −1 −1 1 1 −1 1 −1 −1 1 −1 1 1 −1 1 −1 −1 1 −1 1 1 −1 −1 1 1 −1 1 −1 −1 1 1 −1 −1 1 1 −1 −1 1 1 −1]|
| 2 | [1 −1 −1 1 −1 1 1 −1 −1 1 1 −1 1 −1 −1 1 −1 1 1 −1 −1 1 1 −1 1 −1 −1 1 −1 1 1 −1 −1 1 1 −1 1 −1 −1 1 −1 1 1 −1 1 −1 −1 1 −1 1 1 −1 1 −1 −1 1 −1 1 1 −1 −1 1 1 −1 −1 1 1 −1 1 −1 −1 1 −1 1 1 −1 1 −1 −1 1 −1 1 1 −1 −1 1 1 −1 1 −1 −1 1 −1 1 1 −1 −1 1 1 −1 1 −1 −1 1 −1 1 1 −1 1 −1 −1 1 −1 1 1 −1 −1 1 1 −1 −1 1 1 −1 1 −1 −1 1 1] |
| 3 | [1 −1 −1 1 −1 1 1 −1 −1 1 1 −1 1 −1 −1 1 −1 1 1 −1 −1 1 1 −1 1 −1 −1 1 −1 1 1 −1 −1 1 1 −1 1 −1 −1 1 −1 1 1 −1 1 −1 −1 1 −1 1 1 −1 1 −1 −1 1 −1 1 1 −1 −1 1 1 −1 −1 1 1 −1 1 −1 −1 1 −1 1 1 −1 1 −1 −1 1 −1 1 1 −1 −1 1 1 −1 1 −1 −1 1 1 −1 −1 1 1 −1 −1 1 1 −1 1 −1 −1 1 1 −1 −1 1 1 −1 1 −1 −1 1 −1 1 1 −1 −1 1 1 −1 1 −1 −1 1 1 1 −1] |

$$\theta_f = \frac{33}{132}(n_f/2) \bmod 4 \quad \text{Equation 4}$$

In Equation 4, nf represents a radio frame number and mod represents a modulo function.

The NRS, which is a reference signal for channel estimation required for demodulation of a DL physical channel, is generated in the same manner as in LTE. However, the NRS uses a narrowband-physical cell ID (NB-PCID) (or NCell ID or NB-IoT BS ID) as an initial value for initialization. The NRS is transmitted through one or two antenna ports (p=2000 and 2001).

The NPDCCH has the same transmission antenna configuration as the NPBCH, and delivers DCI. The NPDCCH supports three types of DCI formats. DCI format N0 includes scheduling information about a narrowband physical uplink shared channel (NPUSCH), and DCI formats N1 and N2 includes NPDSCH scheduling information. The NPDCCH may be transmitted repeatedly up to 2048 times, for coverage enhancement.

The NPDSCH is used to transmit data of a transport channel such as a DL-SCH or a paging channel (PCH). The NPDSCH has a maximum TBS of 680 bits and may be transmitted repeatedly up to 2048 times, for coverage enhancement.

Figure 9:
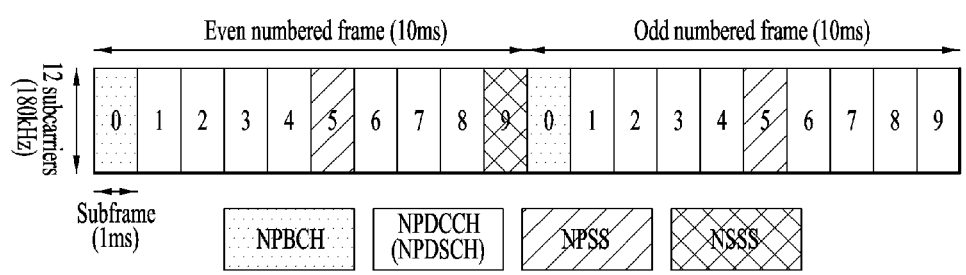
FIG. 9 is a diagram illustrating positions where narrowband Internet of things (NB-IoT) physical DL channels/signals are transmitted in a frequency division duplex (FDD) LTE system.

FIG. 9 is a diagram illustrating positions where narrowband NB-IoT physical DL channels/signals are transmitted in an FDD LTE system.

Referring to FIG. 9, the NPBCH is transmitted in the first subframe of each radio frame, the NPSS is transmitted in the sixth subframe of each radio frame, and the NSSS is transmitted in the last subframe of each even-numbered frame. An NB-IoT UE acquires frequency synchronization, symbol synchronization, and frame synchronization and searches 504 PCIDs (i.e., BS IDs) by synchronization signals (NPSS and NSSS). The LTS synchronization signals are transmitted in 6 PRBs, whereas the NB-IoT synchronization signals are transmitted in one PRB.

In NB-IoT, UL physical channels include a narrowband physical random access channel (NPRACH) and an NPUSCH, and support single-tone transmission and multi-tone transmission. Multi-tone transmission is supported only for an SCS of 15 kHz, and single-tone transmission is supported for SCSs of 3.5 kHz and 15 kHz. On UL, when the SCS is 15 kHz, orthogonality with the LTE system is maintained, thereby providing optimum performance. However, the 3.75-kHz SCS may destroy the orthogonality, resulting in performance degradation due to interference.

An NPRACH preamble includes four symbol groups, each including a CP and five (SC-FDMA) symbols. The NPRACH supports only single-tone transmission with the 3.75-kHz SCS and provides CPs of 66.7 μs and 266.67 μs in length to support different cell radiuses. Each symbol group is subjected to frequency hopping in the following hopping pattern. Subcarriers carrying the first symbol group are determined pseudo-randomly. The second symbol group hops by one subcarrier, the third symbol group hops by six subcarriers, and the fourth symbol group hops by one subcarrier. In the case of repeated transmissions, the frequency hopping procedure is repeatedly applied. To enhance coverage, the NPRACH preamble may be repeatedly transmitted up to 128 times.

The NPUSCH supports two formats. NPUSCH format 1 is used for UL-SCH transmission and has a maximum TBS of 1000 bits. NPUSCH format 2 is used for UCI transmission such as HARQ-ACK signaling. NPUSCH format 1 supports single-tone transmission and multi-tone transmission, whereas NPUSCH format 2 supports only single-tone transmission. In single-tone transmission, p/2-binary phase shift keying (BPSK) and p/4-quadrature phase shift keying (QPSK) may be used to reduce a peak-to-average power ratio (PAPR).

In the stand-alone and guard-band modes, all resources of one PRB may be allocated to NB-IoT. However, there is a constraint on resource mapping in the in-band mode, for co-existence with a legacy LTE signal. For example, resources (OFDM symbols 0 to 2 in each subframe) classified as a region allocated for LTE control channels may not be allocated to the NPSS and NSSS, and NPSS and NSSS symbols mapped to LTE CRS REs are punctured.

Figure 10:
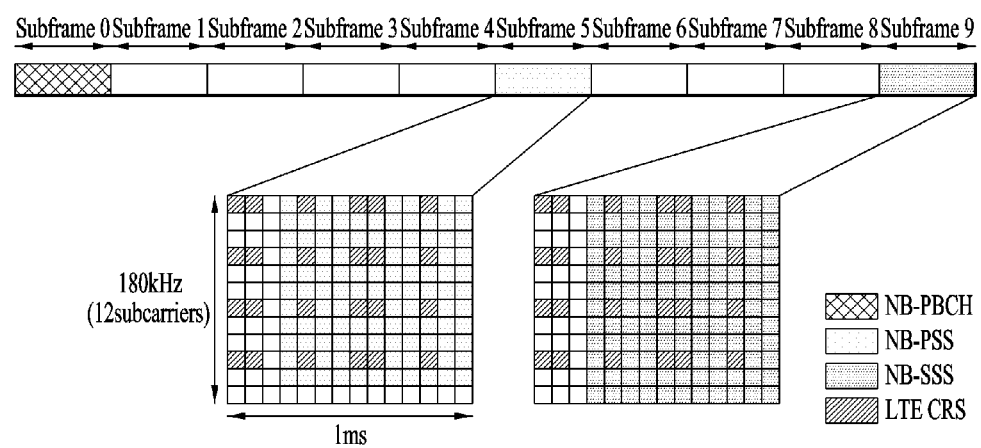
FIG. 10 is a diagram illustrating resource allocation for an NB-IoT signal and an LTE signal in an in-band mode.

FIG. 10 is a diagram illustrating resource allocation to an NB-IoT signal and an LTE signal in the in-band mode. Referring to FIG. 10, for ease of implementation, the NPSS and NSSS are not transmitted in OFDM symbols corresponding to the control region of the legacy LTE system (the first three OFDM symbols of a subframe) regardless of an operation mode. NPSS/NSS REs colliding with LTE CRS REs in physical resources are punctured, for mapping without affecting the legacy LTE system.

After the cell search, the NB-IoT UE demodulates the NPBCH without system information except for a PCID. Therefore, NPBCH symbols may not be mapped to the LTE control channel allocation region. Moreover, since the NB-IoT UE assumes four LTE antenna ports (e.g., p=0, 1, 2, and 3) and two NB-IoT antenna ports (e.g., p=2000 and 2001) in the situation without system information, the NB-IoT UE may not allocate the NPBCH to CRS REs and NRS REs. Therefore, the NPBCH is rate-matched according to available resources.

After demodulating the NPBCH, the NB-IoT UE may acquire information about the number of CRS antenna ports. However, the NB-IoT UE still may not acquire information about the LTE control channel allocation region. Therefore, the NPDSCH carrying system information block type 1 (SIB1) data is not mapped to resources classified as the LTE control channel allocation region.

However, unlike the NPBCH, REs which are not allocated to the LTE CRS may be allocated to the NPDSCH. Since the NB-IoT UE has acquired all information related to resource mapping after receiving SIB1, an eNB may map the NPDSCH (except for the case where SIB1 is transmitted) and the NPDCCH to available resources based on LTE control channel information and the number of CRS antenna ports.

Figure 11:
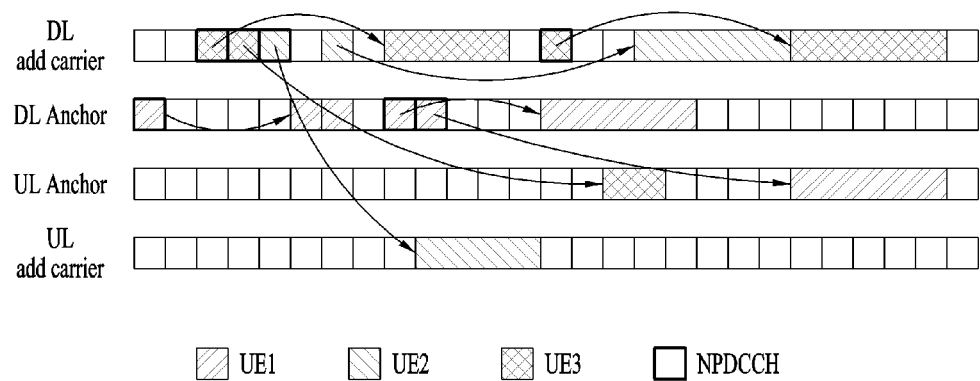
FIG. 11 is a diagram illustrating multi-carrier scheduling.

FIG. 11 is a diagram illustrating an exemplary operation when multiple carriers are configured in FDD NB-IoT. In FDD NB-IoT, a DL/UL anchor carrier is basically configured, and a DL (and UL) non-anchor carrier may be additionally configured. RRCConnectionReconfiguration may include information about the non-anchor carrier. When the DL non-anchor carrier is configured, a UE receives data only in the DL non-anchor carrier. In contrast, synchronization signals (NPSS and NSSS), a broadcast signal (MIB and SIB), and a paging signal are provided only in the anchor carrier. When the DL non-anchor carrier is configured, the UE listens to only the DL non-anchor carrier while the UE is in an RRC_CONNECTED state. Similarly, when the UL non-anchor carrier is configured, the UE transmits data only in the UL non-anchor carrier, not being allowed to transmit data simultaneously in the UL non-anchor carrier and the UL anchor carrier. When the UE transitions to an RRC_IDLE state, the UE returns to the anchor carrier.

In the illustrated case of FIG. 11, UE1 is configured only with anchor carriers, UE2 is configured additionally with a DL/UL non-anchor carrier, and UE3 is configured additionally with a DL non-anchor carrier. Accordingly, each UE transmits and receives data in the following carriers.

UE1: data reception (DL anchor carrier) and data transmission (UL anchor carrier)

UE2: data reception (DL non-anchor carrier) and data transmission (UL non-anchor carrier)

UE3: data reception (DL non-anchor carrier) and data transmission (UL anchor carrier)

The NB-IoT UE is not capable of simultaneous transmission and reception, and a transmission/reception operation is limited to one band. Therefore, even though multiple carriers are configured, the UE requires only one transmission/reception chain in a 180-kHz band.

Embodiments: Flexible UL/DL Configuration

In a TDD system, the number of DL subframes and the number of UL subframes may vary according to UL/DL configurations as listed in Table 1. A UL/DL configuration is signaled by system information and it is difficult to dynamically or (semi-)statically reconfigure the UL/DL configuration within a cell. Particularly in a system such as NB-IoT, a data transmission/reception frequency required by each UE is very low and data is mostly delay-tolerant. Therefore, it may be effective to use a subframe for DL or UL as needed, rather than each subframe is fixed to a specific direction (UL or DL). Particularly when the direction of a subframe is set to DL in spite of the absence of DL traffic, unnecessary inter-cell interference is caused. Accordingly, a dynamic subframe direction configuration may be used as an effective inter-cell interference avoidance technique.

A flexible UL/DL configuration method proposed in the present disclosure may be applied to a system in which a specific frequency band is not fixed to a certain duplex mode or the duplex mode of a specific frequency band is set to TDD with an effective/adaptive use of a UL/DL ratio, and a future system for which it is difficult to estimate a TDD UL/DL configuration combination. For example, a low-cost device such as an NB-IoT or eMTC device needs to be designed such that once it is installed at a specific location, it may last for 10 or more years without any special maintenance and repair. It is not clear whether all of future requirements may be satisfied with the current TDD UL/DL configurations. Moreover, there is an operation mode for NB-IoT, which is serviceable separately from legacy LTE, such as stand-alone mode. This implies that NB-IoT needs to be deployed in an environment with more various configurations than the current TDD UL/DL configurations. For this purpose, the present disclosure proposes a method of using a TDD UL/DL configuration more actively/adaptively. While the present disclosure is described in the context of an NB-IoT system for the convenience of description, the present disclosure is not limited to the NB-IoT system. For example, the present disclosure is also applicable to a system requiring repeated transmissions, such as eMTC and other general systems to which a dynamic configuration is important, such as new radio (NR). The present disclosure is largely divided into (1) flexible UL/DL configuration, (2) default UL/DL subframe configuration, (3) fixed UL/DL subframe configuration, and (4) floating UL/DL subframe configuration.

In the present disclosure, the term subframe may be interchangeably used with TTI, slot, and symbol (e.g., OFDM symbol and SC-FDMA symbol), and UL/DL may be interchangeably used with DL/UL. Further, the NPDCCH may cover the PDCCH or DL (physical) control channel, and the NPDSCH may cover the PDSCH, DL (physical) shared channel, or DL (physical) data channel. Further, the NPUSCH may cover the PUSCH, UL (physical) shared channel, or UL (physical) data channel.

(1) Flexible UL/DL Configuration

First, a flexible UL/DL subframe, a default UL/DL subframe, a fixed UL/DL subframe, and a floating UL/DL subframe may be defined as follows.

[Method #1] Definition of Flexible DL/UL Subframe (Slot)

- A UL/DL subframe may be configured aperiodically so that the UL/DL subframe does not always exist.
- When a specific subframe is defined as a DL, UL, or unused subframe, a subframe configuration may be defined/understood differently between UEs within a cell.
- UL/DL subframes may include default UL/DL subframes, fixed UL/DL subframes, and floating UL/DL subframes.
- A fixed UL/DL subframe set may include a default UL/DL subframe set at a specific time. There may be no intersection between the fixed UL/DL subframe set and a floating UL/DL subframe set.
- The total time resources may be equal to or larger than the union of the default UL/DL subframes, the fixed UL/DL subframes, and the floating UL/DL subframes.
- A time gap for DL/UL switching (e.g., similar in concept to a special subframe period in the LTE system) may not be explicitly included in a default UL/DL subframe, a fixed UL/DL subframe, and a floating UL/DL subframe.

[Method #2] Definition of Default DL/UL Subframe

- A default UL/DL subframe is a UL/DL subframe that may always be assumed to be a DL or UL subframe even during an initial operation of a UE. The set of default UL/DL subframes may be null according to a use frequency or the like.
- DL subframes and UL subframes may be non-contiguous within the default DL/UL subframes. Further, the numbers of DL subframes and UL subframes may be different in the default UL/DL subframes.
- It may be restricted that adjacent cells have the same default UL/DL subframes. The UE may expect a neighbor cell to have the same default UL/DL subframe configuration as that of a serving cell.

[Method #3] Definition of Fixed UL/DL Subframe

- A fixed DL/UL subframe may be defined to use a subframe which is not included in the default UL/DL subframes as a DL or UL subframe for a predetermined time period or until a specific indication is received.
- Fixed UL/DL subframes may be configured by a higher-layer message such as SIB1-NB or SIB2-NB.
- Although a signal/message that configures the fixed UL/DL subframes may indicate fixed DL or UL only for subframes excluding the default UL/DL subframes, (sets of) the configured DL and UL subframes may be defined to include default DL subframes and default UL subframes, respectively.
- Information about the fixed DL/UL subframes may be broadcast to all UEs by a cell-common signal. When the information about the fixed UL/DL subframes is updated, the UEs may be instructed to acquire the information about the fixed UL/DL subframes again by a system information modification and paging.
- An RRC IDLE-state UE may be configured to expect paging reception or perform measurement by fixed DL subframe information. Further, the UE may be instructed to perform paging monitoring/measurement only in a default DL subframe, when the UE enters the RRC IDLE state.
- Fixed UL/DL subframes may be configured differently according to a relative distance between a UE and an eNB within a cell or a DL received signal strength (e.g., reference signal received power (RSRP) measurement or coverage enhancement (CE) level) of the UE. A CE level may be similar in concept to the distance between a UE and a cell. That is, a CE level is determined according to the power of a signal received from a serving cell. A mobility management entity (MME) may define up to 3 CE levels, that is, CE level 0 to CE level 2. A message is transmitted multiple times repeatedly according to the CE level of a UE based on the location of the UE.

[Method #4] Definition of Floating UL/DL Subframe

- A floating UL/DL subframe may be used as a DL resource or an UL resource, or not used at a specific time.
- Information about a floating UL/DL subframe configuration (e.g., a subframe/slot format indicator (SFI)) may be transmitted in a higher-layer message (e.g., an RRC or MAC message), on a specific physical channel (e.g., NPDCCH), or in DCI.

A specific set of finite floating UL/DL configuration combinations may be defined and a UL/DL configuration may be changed every predetermined period or at a specific time.

A specific UE within a cell may be configured such that the UE does not perceive a floating UL/DL configuration. For example, a UE at a cell edge which may cause inter-cell/inter-link interference may be configured to use only a fixed DL/UL subframe. The cell-edge UE may be defined as a UE having a specific CE level and/or a timing advance (TA) of a specific value or higher and/or transmission power of a specific value or higher or an RSRP of a specific value or less.

A floating UL/DL subframe configuration may be UE-specific.

When a link direction needs to be defined in a smaller unit within a subframe, a sub-unit may be used. In the LTE system, for example, when the link direction of a specific subframe indicated as a floating subframe is set to DL, a floating DL sub-unit may be used to indicate the length of a DwPTS in the subframe. For example, regarding the floating DL sub-unit, when flexible DL subframes are consecutively configured for a predetermined time period, the last of the flexible DL subframes may always follows the definition of a flexible DL sub-unit. On the assumption that there are four floating DL subframes and a flexible DL sub-unit includes 3 OFDM symbols, the fourth floating DL subframe is an incomplete DL subframe including 3 OFDM symbols. In contrast, when consecutive flexible UL subframes are configured for a predetermined time period, the first of the flexible UL subframes may always be based on the definition of a flexible UL sub-unit.

[Method #5] Definition of Floating DL/UL Sub-Unit and Method of Configuring Floating DL/UL Sub-Unit When the length of a floating UL/DL subframe (e.g., the number of symbols in one subframe) is N, floating DL/UL sub-units may be configured by integers representing 1 to N−1 or a bitmap of size (N−2).

Each floating DL/UL sub-unit may represent the DL/UL configuration of the last/first of floating DL/UL subframes.

When the first of consecutive UL subframes is a floating UL subframe, the first floating UL subframe is configured based on the definition of a floating UL sub-unit.

When there is only one UL subframe, the floating UL sub-unit is not applied.

When the first of consecutive DL subframes is a floating DL subframe, the last floating DL subframe is configured based on the definition of a floating DL sub-unit.

When there is only one DL subframe, the floating DL sub-unit is not applied.

Signal(s) and channel(s) transmittable in a fixed DL subframe and a fixed UL subframe are proposed as follows.

[Method #6] Method of Constructing and Configuring Fixed DL/UL Subframe

The UE may determine default DL/UL subframes according to a carrier frequency and/or a business operator and/or a country (region) in which the UE attempts initial access.

When there is no default DL/UL subframe configuration value corresponding to the above condition or the UE does not have knowledge of a default DL/UL subframe configuration value, the UE may operate on the assumption that there are no default DL/UL subframes.

When the UE enters the RRC IDLE state or attempts access again after disconnection from a network for a specific time, the UE may attempt initial access on the assumption of a previously used default DL/UL configuration. Accordingly, the UE may perform paging monitoring and measurement in a default DL subframe.

The UE may acquire information about fixed DL/UL subframes (slots) (including default DL/UL subframes (slots)) on a broadcast channel (e.g., NPBCH, SIB1-NB, and SIB-NB in NB-IoT) during initial access.

When a UL/DL subframe configuration is dynamically changed by an SFI or the like, a symbol, slot, or subframe carrying the SFI may be designated as a fixed DL subframe or a default DL subframe.

[Method #7] Method of Constructing and Configuring Floating DL/UL Subframe (Slot)

A subframe which is not included in fixed DL/UL subframes may be designated as a floating DL/UL subframe and used as a UL or DL subframe at a specific time. A subframe which is not included in either of fixed DL/UL subframes and floating DL/UL subframes may be defined as an unused subframe.

The unused subframe may be used for a DL/UL switching gap of the UE, and information about the unused subframe may not be included in a dynamic or (semi-)static signal/message indicating a link direction (DL or UL) for a floating DL/UL subframe.

A subframe which has not been indicated as a fixed DL/UL subframe may not be allowed to be used additionally according to the CE mode/level of the UE. For example, the UE may not be allowed to receive floating DL/UL configuration information according to the CE mode/level of the UE.

It may be restricted that a floating UL subframe should not be used according to a CE mode/level, UL transmission power, or a TA value.

When a floating DL/UL subframe (slot) is indicated, a DL/UL switching gap may not be indicated separately (explicitly).

A subframe which has not been indicated as a fixed UL/DL subframe (e.g., a floating subframe) may be temporarily allowed to be used as a DL or UL subframe in a cell or only for a specific UE as needed. In this case, when specific subframe(s) transmitted at the same time (e.g., within an error of a subframe level) between adjacent cells are used in different directions between the cells (e.g., used for DL in one specific cell, but for UL in another cell), interference may occur between the adjacent cells. This is mainly caused when a UE located at the boundary between cells experiences interference from a UE transmitting a UL signal with high power at the boundary of a neighbor cell, during reception of a DL signal from its serving cell, or when an eNB experiences interference from a neighbor eNB by receiving a DL signal from the neighbor eNB, during reception of a UL signal. To avert this problem, the transmission power of a UE transmitting a UL signal in a floating subframe or the transmission power of an eNB transmitting a DL signal in a floating subframe may be restricted. For this purpose, only a UE closest to a serving cell may be allowed to use a floating subframe for UL or to expect DL in a floating subframe. CE levels are defined in such a system as eMTC and NB-IoT. For example, an MME may define up to three CE levels, that is, CE level 0 to CE level 2. Because the CE level of a UE is determined according to the power of a signal received from a serving cell, the CE level may be used similarly to the distance between the cell and the UE in concept. For example, as a signal transmitted by an eNB is received with lower power than a specific value set by the eNB, a higher CE level is set. Therefore, a UL signal transmission may not be allowed or a DL signal reception may not be expected in a floating subframe according to a CE level (equal to or higher than a predetermined value). Besides, because an MTC/NB-IoT UE of a high CE level (a UE receiving a signal from an eNB at lower power than an eNB-set value) transmits a signal with maximum power or almost maximum power, the MTC/NB-IoT UE may cause severe interference to DL signal receptions of neighbor-cell UEs. Therefore, in a system such as eMTC and NB-IoT, the eNB may indirectly indicate whether the use of a floating subframe is allowed by using a CE level. For example, the cell may broadcast to UEs within the cell that it is restricted that a UE having a CE level greater than CE level X (a UE distant from the cell) neither expects nor transmits a DL and/or UL signal in a floating subframe. The CE levels may not be affected simply by the distances between the serving cell and UEs. For example, when MTC/NB-IoT UEs are installed on the inner wall of a building or underground, the MTC/NB-IoT UEs are close to the serving cell (i.e. not in the vicinity of the boundary of a neighbor cell and the serving cell). However, the MTC/NB-IoT UEs may have high CE levels due to great penetration loss. In this case, the distances between the serving cell and the UEs may be estimated using TA values. Accordingly, the eNB may use a parameter directly/indirectly related to the CE level and/or TA of each UE as a condition of using a floating subframe for UL and/or UL for the UE. This method may reduce the burden of signaling the use of a floating subframe to each individual UE and may also apply to UEs in the RRC IDLE/inactive state to which UE-dedicated signaling is not available. That is, even when a UE is not RRC-connected, the UE may identify a subframe which the UE may use or expect according to the CE level and/or mode and/or TA value specified for a condition for using a floating subframe, broadcasted by the eNB.

Methods of configuring and updating fixed UL/DL subframes and floating UL/DL subframes as defined above in a serving cell and a neighbor cell are given as follows.

[Method #8] Method of Updating DL/UL Subframe Configuration

For a subframe set except for fixed DL/UL subframes, a floating DL/UL subframe may be dynamically configured and updated by using an SFI.

The UE may receive, from the serving cell, information about the position of a subframe available as a DL or UL subframe throughout a specific period in a neighboring cell, for a subframe which does not correspond to a default DL/UL subframe.

(2) Default UL/DL Subframe Configuration

Signal(s) and channel(s) that may be transmitted in default UL and DL subframes are proposed.

[Method #9] Method of Configuring Broadcast Signal(s) and Channel(s)

The NPSS/NSSS/MIB-NB/SIB1-NB may be transmitted in a default DL subframe.

The positions of each signal and each channel in a subframe may be defined differently according to a default DL/UL subframe configuration. For example, the position of the NPSS/NSSS/MIB-NB/SIB1-NB may be different in default DL/UL subframes A and B.

When there are two or more default DL/UL subframe configurations, the default DL/UL subframe configurations may be detected by the subframe interval of the NPSS, the subframe interval of the NSSS, or the subframe intervals of the NPSS and NSSS. In this case, the position of the MIB-NB in a subframe may be determined according to the above condition.

The position of the SIB1-NB in a subframe may be explicitly indicated by the MIB-NB, which may be limited to a combination of specific positions.

The position of a subframe, slot or OFDM symbol carrying the SFI may be limited to a default DL subframe.

The position of the subframe, slot or OFDM symbol carrying the SFI may be defined differently according to a default DL/UL subframe configuration. For example, the position of the SFI may be different in default DL/UL subframes A and B.

The position of some NPDCCH monitoring subframe may be limited to a default DL subframe.

An NPDCCH monitoring subframe (search space) requiring decoding before the position of a fixed DL/UL subframe may be configured in a default DL subframe. For example, an NPDCCH scrambled with a specific RNTI may be transmitted only in the default DL subframe.

A UE in an RRC Connected state may also monitor a user-specific search space (USS) NPDCCH in a default DL subframe according to a network order.

The maximum number of NPDCCH transmissions, Rmax may vary depending on the number of default DL subframes within a specific period.

Unlike default DL subframes, there may be no default UL subframe.

The UE may perform DL measurement only in a default DL subframe (depending on the purpose).

A DL measurement subframe which may be referred to in selecting a serving cell by the UE may be limited to a default DL subframe.

A subframe which may be used for DL measurement in selecting a CE level or PRACH may be limited to a default DL subframe.

DL measurement requiring reflection of interference characteristics may be performed only in a floating DL subframe or an unused (undefined) DL subframe except for default DL subframes.

The MTC/NB-IoT system is characterized by repeated transmissions for coverage extension, and the same scrambling, redundancy version (RV), precoding, and/or rate-matching is used for a predetermined period during repeated transmissions to reduce UE complexity. That is, when the same information is repeatedly transmitted for a time period of Y, it is allowed to change the scrambling, RV, precoding and/or rate-matching of a signal repeatedly transmitted for the previous time period of X only at the boundary of a time period of X (X<Y). This is intended to reduce the receiver complexity of a UE by enabling the receiver to use QAM-level or OFDM symbol-level combining. Here, X may be a time period or the number of subframes, and may be defined to include only BL/CE subframes or valid subframes (subframes that the UE may expect the system to use) or include all subframes. In this case, when only BL/CE subframes or valid subframes may be included in the time period of X and thus there are many discontinuous intervals in the time period of X, a coverage extension gain obtained by repeated transmission during the time period of Y may be reduced. Accordingly, the maximum number of repeated transmissions Rmax of the PDCCH/NPDCCH/MPDCCH/PDSCH/NPDSCH/MPDSCH and the PRACH/NPRACH/PUCCH/NPUSCH/MPUSCH may be defined differently according to the number of default DL subframes, the number of default UL subframes, the number of fixed DL subframes, and/or the number of fixed UL subframes. Besides, because whether a floating DL/UL subframe is used or not may be determined differently for each UE according to a CE level and/or a TA, floating subframes may be excluded from Rmax calculation in order to prevent different understanding of Rmax of a channel shared by UEs (e.g., PDCCH/ NPDCCH/MPDCCH/PRACH/NPRACH that any UE may expect to receive or may be allowed to transmit). In contrast, for a UE UE-specific channel (e.g., PDSCH/NPDSCH/ MPDSCH/PUSCH/NPUSCH/MPUSCH), floating subframes may be included in Rmax calculation. In the MPDCCH/MPDSCH/MPUSCH, M represents machine type communication (MTC).

(3) Fixed UL/DL Subframe Configuration

Signal(s) and channel(s) transmittable in a fixed UL subframe and a fixed DL subframe are proposed.

[Method #10] Method of Configuring DL Common Channel(s)

The position of some NPDCCH monitoring subframe may be limited to a fixed DL subframe.

A search space (e.g., common search space (CSS)) except for at least a USS may be transmitted only in a fixed DL subframe.

Only an NPDCCH scrambled with a specific RNTI may be transmitted in a default DL subframe.

A UE in an RRC Connected state may also monitor a USS NPDCCH in a fixed DL subframe according to a network order.

The maximum number Rmax of repeated transmissions of the NPDCCH may vary depending on the number of default DL subframes within a specific period.

An NPDSCH carrying a BCCH may be transmitted only in a fixed DL subframe.

The transmission periodicity and pattern of the BCCH may be different according to the configuration/setting of the fixed DL subframe.

An NPDSCH which does not carry a BCCH may also be transmitted only in a fixed DL subframe according to a specific condition.

An NPDSCH of a UE which has a specific CE level, a TA equal to or larger than a predetermined value, transmission power equal to or larger than a predetermined value, and/or an RSRP equal to or less than a predetermined value may always be transmitted only in a fixed DL subframe.

Signals and channels may be transmitted/received only in fixed UL/DL subframes during random access.

A random access response (RAR) of a UE which has transmitted an NPRACH in a fixed UL subframe may be received only in a fixed DL subframe.

Msg4 (contention resolution message) of a UE which has transmitted Msg3 in a fixed UL subframe according to a UL grant in the RAR may be received only in a fixed DL subframe.

[Method #11] Method of Configuring UL Signal(s) and Channel(s) Initiated by UE

A contention-based NPRACH may be transmitted only in a fixed UL subframe. However, a contention-free based NPRACH (NPDCCH-ordered NPRACH) may be transmitted only in a floating UL subframe or in the union of a fixed UL subframe and a floating UL subframe.

A scheduling request (SR) signal and channel may be transmitted only in a fixed UL subframe. However, when the SR is piggybacked to NPUSCH format 1, the SR may also be transmitted in a floating UL subframe.

NPUSCH format 2 (ACK) for DL early termination may also be transmitted in a fixed UL subframe. When receiving NPUSCH format 2 (ACK) in the fixed UL subframe, the eNB may discontinue an on-going NPDSCH transmission.

[Method #12] Method of Configuring Uplink Control Information (UCI)

It may be configured that UCI is transmitted only in a fixed UL subframe according to the importance of the UCI. It may be configured that at least an ACK/NACK is transmitted only in a fixed UL subframe.

(4) Floating UL/DL Subframe Configuration

Signal(s) and channel(s) transmittable in floating UL and DL subframes are proposed.

[Method #13] Method of Configuring Floating DL Subframe

The USS NPDCCH may also be transmitted in a floating DL subframe.

According to a network order, some USS may be transmitted in the union of a fixed DL subframe and a floating UL subframe.

The NPDSCH may be transmitted in a floating DL subframe.

An NPDSCH which does not carry a BCCH may be transmitted in a floating DL subframe according to a network order.

An NPDSCH transmitted in a floating DL subframe may be transmitted across (in the union of) fixed DL and floating DL subframes.

When the NPDCCH/NPDSCH is transmitted in the union of a fixed DL subframe and a floating DL subframe, an NPDCCH/NPDSCH scrambling sequence may be (re-)initialized at the boundary between the fixed DL subframe and the floating DL subframe.

Measurement performed on an NRS transmitted in a floating DL subframe may be managed in a measurement process different from that for measurement performed only in a fixed DL subframe or a default DL subframe.

The NRS transmission power of a floating DL subframe may be different from the NRS transmission power of a fixed DL subframe.

The transmission power of the NRS and the NPDSCH and/or the NPDCCH may be different between the floating DL subframe and the fixed DL subframe.

An NPDSCH repetition pattern may be different between a fixed DL subframe and a floating DL subframe.

In the MTC/NB-IoT system characterized by repeated transmissions, one piece of information/data may be transmitted across a fixed DL subframe and a floating DL subframe. In this case, the transmission power and repeated transmission pattern of the same information/data may be differently applied in different types of DL subframe periods. For example, the transmission power of the floating DL subframe may be set lower than that of the fixed DL subframe, and different repetition numbers may be set for the floating DL subframe and the fixed DL subframe. When the difference in transmission power between the two types of DL subframes is greater than a specific value, it may not be allowed to transmit the same information/data across the floating DL and fixed DL subframes. When the difference in transmission power between the two types of DL subframes is equal to or less than the specific value, the same information/data may be transmitted across the floating DL and fixed DL subframes. In addition, it may be defined while an RV, a scrambling sequence, and a PMI are changed after every N subframe repeated transmissions in the fixed DL subframe, an RV, a scrambling sequence, and a PMI are changed after every M subframe repeated transmissions in the floating DL subframe. The relationship between N and M may be defined according to the difference in transmission power between the two types of DL subframes. For example, when the transmission power of the fixed DL subframe is larger than that of the floating DL subframe, N may be set smaller than M.

[Method #14] Method of Configuring Floating UL Subframe

An NPUSCH may be transmitted across (in the union of) a fixed UL subframe and a floating UL subframe.

When the NPUSCH is transmitted in the union of the fixed UL subframe and the floating UL subframe, the transmission power of the NPUSCH may be different between the fixed UL subframe and the floating UL subframe.

When the NPUSCH is transmitted in the union of the fixed UL subframe and the floating UL subframe, the scrambling sequence of the NPUSCH may be (re-)initialized at the boundary between the fixed UL subframe and the floating UL subframe.

The repetition pattern of the NPUSCH may be different between the fixed UL subframe and the floating UL subframe.

The transmission of the NPUSCH in the floating UL subframe may be set equal to or lower than the transmission power of the NPUSCH in the fixed UL subframe.

The power control of the NPUSCH may be configured based on the fixed UL subframe, and the transmission power of the floating UL subframe may be set to have a specific offset from the transmission power of the fixed UL subframe.

The power control of the NPUSCH may be configured based on the floating UL subframe, and the transmission power of the fixed UL subframe may be set to have a specific offset from the transmission power of the floating UL subframe.

In the MTC/NB-IoT system characterized by repeated transmissions, one piece of information/data may be transmitted across a fixed UL subframe and a floating UL subframe. In this case, the transmission power and repeated transmission pattern of the same information/data may be differently applied in different types of UL subframe periods. For example, the transmission power of the floating UL subframe may be set lower than that of the fixed UL subframe, and different repetition numbers may be set for the floating UL subframe and the fixed UL subframe. When the difference in transmission power between the two types of UL subframes is greater than a specific value, it may not be allowed to transmit the same information/data across the floating UL and fixed UL subframes. When the difference in transmission power between the two types of UL subframes is equal to or less than the specific value, the same information/data may be transmitted across the floating UL and fixed UL subframes. In addition, it may be defined while an RV, a scrambling sequence, and a PMI are changed after every N subframe repeated transmissions in the fixed UL subframe, an RV, a scrambling sequence, and a PMI are changed after every M subframe repeated transmissions in the floating UL subframe. The relationship between N and M may be defined according to the difference in transmission power between the two types of UL subframes. For example, when the transmission power of the fixed UL subframe is larger than that of the floating UL subframe, N may be set smaller than M.

Figure 12:
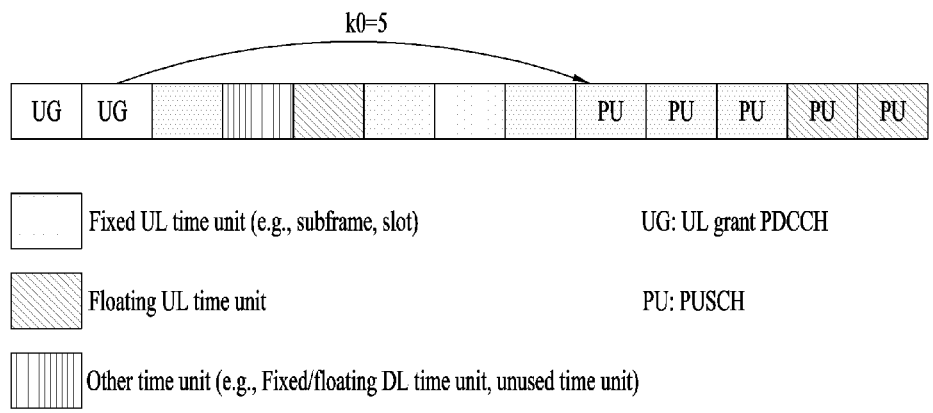
FIG. 12 is a diagram illustrating signal transmission and reception according to an example of the present disclosure.

FIG. 12 illustrates signal transmission and reception according to an example of the present disclosure. Referring to FIG. 12, a UE may repeatedly receive a PDCCH including scheduling information (UG). The scheduling information includes time delay information kO. The UE may then repeatedly transmit a PUSCH indicated by the scheduling information after a time indicated by the time delay information kO from a time when the repeated receptions of the PDCCH are terminated. In the time domain, the time resources may include a fixed DL time unit with a transmission direction fixed to DL. The time resources may include a fixed UL time unit with a transmission direction fixed to DL and a floating time unit with a flexible transmission direction. In this case, the time indicated based on the time delay may be calculated based on only the fixed UL time unit.

The repeated transmissions of the PUSCH may be scheduled to be transmitted across a fixed UL time unit set and a floating UL time unit set. In this case, when the difference between the transmission power of a fixed UL time unit and the transmission power of a floating UL time unit is greater than a specific value, the repeated transmissions of the PUSCH may be performed only in the fixed UL time unit set.

Further, when the repeated transmissions of the PUSCH are performed across the fixed UL time unit set and the floating UL time unit set, a scrambling sequence used for the repeated transmissions of the PUSCH may be initialized at the boundary between the fixed UL time unit set and the floating UL time unit set. Further, the scrambling sequence may be initialized every N PUSCH transmissions in the fixed UL time unit set, and every M PUSCH transmissions in the floating UL time unit set, and N and M may be different from each other. When the transmission power of the fixed UL time unit is greater than the transmission power of the floating UL time unit, N may be set smaller than M.

Further, in NB-IoT, the PDCCH may include the NPDCCH, and the PUSCH may include the NPUCCH. In addition, a wireless communication system supporting NB-IoT may be used.

[Method #15] Method of Indicating Floating UL/DL Subframe

Information indicating a floating UL subframe and a floating DL subframe may be delivered by different signaling or messages.

The floating DL subframe may be indicated by a DL grant, and the floating UL subframe may be indicated by a UL grant.

A unit time in which the floating UL subframe is indicated may be equal to or longer than a unit time in which the floating DL subframe is indicated.

The floating DL subframe may be indicated in units of a subframe or TTI (e.g., 1 msec), while the floating UL subframe may be indicated in units of a slot or resource unit (e.g., 2 msec).

[Method #16] Method of Avoiding Collision with Other UL Signal(s) and Channel(s)

In order to prevent collision between an NPUSCH transmission and an NPRACH transmission, NPRACH resources may be separately configured in a fixed UL subframe and a floating UL subframe.

In order to prevent collision between the NPUSCH transmission and the NPRACH transmission, a UL grant may include information about an NPUSCH resource that may be transmitted in a floating UL subframe.

[Method #17] Method of Counting a Scheduling Delay (DL Grant-to-Scheduled NPDSCH and UL Grant-to-Scheduled NPUSCH Format 1) and an ACK/NACK Delay (Scheduled NPDSCH-to-ACK/NACK Report Subframe), when Floating DL/UL Subframes are Used.

The DL grant-to-scheduled NPDSCH delay is a time interval between the ending time (e.g., subframe or slot) of repeated receptions of a DL grant and the starting time (e.g., subframe or slot) of repeated receptions of an NPDSCH, indicated by a DL grant NPDCCH. The UL grant-to-scheduled NPUSCH delay is a time interval between the ending time (e.g., subframe or slot) of repeated receptions of a UL grant NPDCCH and the starting time (e.g., subframe or slot) of repeated transmissions of an NPUSCH, indicated by a UL grant NPDCCH. The scheduled NPDSCH-to-ACK/NACK delay is a time interval between the ending time (e.g., subframe or slot) of repeated receptions of the NPDSCH and the starting time (e.g., subframe or slot) of repeated transmissions of an ACK/NACK for the NPDSCH, indicated by a DL grant NPDCCH.

- The delays may be counted based on an absolute subframe number (without differentiation between UL and DL subframes).
- The delays may be counted based on fixed DL/UL subframes. Specifically, the following options may be considered.
- The delays may be counted without differentiation between UL and DL subframes.
- The DL grant-to-scheduled NPDSCH delay may be counted based on fixed DL subframes.
- The DL grant-to-scheduled NPDSCH delay may be counted by excluding only fixed UL subframes from the absolute subframe number.
- The UL grant-to-scheduled NPUSCH delay may be counted based on fixed UL subframes.
- The UL grant-to-scheduled NPUSCH delay may be counted by excluding the fixed DL subframes from the absolute subframe number.
- The ACK/NACK delay may be counted based on fixed DL/UL subframes without differentiation between DL and UL subframes.
- The ACK/NACK delay may be counted by excluding only fixed UL subframes from the absolute subframe number.
- The ACK/NACK delay may be counted by excluding only fixed DL subframes from the absolute subframe number.

In the MTC/NB-IoT system, a minimum time interval between channels is strictly defined to secure a computation time for a low-cost UE. It is defined that the minimum time interval between channels is counted in consideration of absolute time irrespective of whether a subframe is a BL/CE subframe or a valid subframe, and is reflected in the minimum value of the scheduling delay. However, when the DL and UL periods are mixed in the time domain as in a TDD system, a scheduling delay counted only in absolute time may not be enough. For example, although scheduling delay information included in a DL grant indicates that an (N)PDSCH exists 4 msec, 4 subframes, or 4 slots after the DL grant, the corresponding period may not be a DL period. Further, even when the position of the (N)PDSCH is indicated by a maximum value of the scheduling delay, DL subframes existing between the minimum value and the maximum value of the scheduling delay from the DL grant may not be sufficient, which may lower scheduling freedom. In the TDD system, therefore, scheduling delays in DL and UL grants may be defined to include only DL subframe periods and a UL subframe periods, respectively. In this case, it is necessary to determine whether to include only the fixed type of DL(UL) subframe periods of the DL(UL) grant or even the floating type of DL(UL) subframe periods of the DL(UL) grant. In the present disclosure, the type of subframes included in the scheduling delay may vary for each UE according to the CE level of the UE. For example, a scheduling delay set in a DL(UL) grant for a specific UE may include only fixed DL(UL) subframes, both fixed and floating DL(UL) subframes, or fixed DL(UL) subframes and floating subframes (without differentiation between DL and UL). Accordingly, the UE may interpret the scheduling delay set in the DL(UL) grant differently based on its CE level.

Figure 13:
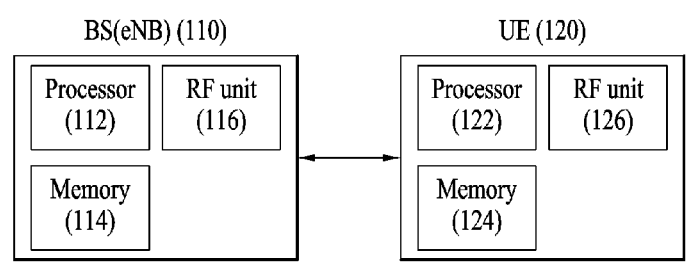
FIG. 13 is a block diagram illustrating a base station (BS) and a user equipment (UE) applicable to the present disclosure.

FIG. 13 illustrates a BS and a UE of a wireless communication system, which are applicable to embodiments of the present disclosure.

Referring to FIG. 13, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present disclosure. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present disclosure. The memory 124 is connected to the processor 122 and stores information related to operations of the processor 122. The RF unit 126 is connected to the processor 122 and transmits and/or receives an RF signal.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, eNBs or other apparatuses of a wireless mobile communication system.

What is claimed is:

1. A method of transmitting a signal by a user equipment (UE) in a wireless communication system, the method comprising:
    repeatedly receiving a physical downlink control channel (PDCCH) including scheduling information, the scheduling information including time delay information; and
    repeatedly transmitting a physical uplink shared channel (PUSCH) indicated by the scheduling information after a time point indicated by the time delay information from an ending time of the repeated receptions of the PDCCH,
    wherein time resources in a time domain include a fixed downlink (DL) time unit with a transmission direction fixed to DL, a fixed uplink (UL) time unit with a transmission direction fixed to UL, and a floating time unit with a flexible transmission direction, and the time point indicated by the time delay information is calculated based on the fixed UL time unit, and
    wherein based on the repeated transmissions of the PUSCH being scheduled to be transmitted across a fixed UL time unit set and a floating UL time unit set, the repeated transmissions of the PUSCH are performed only in the fixed UL time unit set based on a difference between transmission power of the fixed time unit and transmission power of the floating UL time unit being larger than a predetermined value.

2. The method according to claim 1, wherein based on the repeated transmissions of the PUSCH being scheduled to be transmitted across a fixed UL time unit set and a floating UL time unit set, a scrambling sequence used for the repeated transmissions of the PUSCH is initialized at a boundary between the fixed UL time unit set and the floating UL time unit set.

3. The method according to claim 1, wherein based on the repeated transmissions of the PUSCH being scheduled to be transmitted across a fixed UL time unit set and a floating UL time unit set, a scrambling sequence is initialized every N PUSCH transmissions in the fixed UL time unit set and every M PUSCH transmissions in the floating UL time unit set, and N and M are different.

4. The method according to claim 3, wherein transmission power of the fixed UL time unit is greater than transmission power of the floating UL time unit, and N is less than M.

5. The method according to claim 1, wherein the PDCCH includes a narrowband PDCCH (NPDCCH), and the PUSCH includes a narrowband PUCCH (NPUCCH).

6. The method according to claim 1, wherein the wireless communication system includes a wireless communication system supporting narrowband Internet of things (NB-IoT).

7. A user equipment (UE) used in a wireless communication system, the UE comprising:
    a radio frequency (RF) module; and
    a processor,
    wherein the processor is configured to repeatedly receive a physical downlink control channel (PDCCH) including scheduling information, the scheduling information including time delay information, and repeatedly transmit a physical uplink shared channel (PUSCH) indicated by the scheduling information after a time point indicated by the time delay information from an ending time of the repeated receptions of the PDCCH, and
    wherein time resources in a time domain include a fixed downlink (DL) time unit with a transmission direction fixed to DL, a fixed uplink (UL) time unit with a transmission direction fixed to UL, and a floating time unit with a flexible transmission direction, and the time point indicated by the time delay information is calculated based on the fixed UL time unit, and
    wherein based on the repeated transmissions of the PUSCH being scheduled to be transmitted across a fixed UL time unit set and a floating UL time unit set, the repeated transmissions of the PUSCH are performed only in the fixed UL time unit set based on a difference between transmission power of the fixed time unit and transmission power of the floating UL time unit being larger than a predetermined value.

8. The UE according to claim 7, wherein based on the repeated transmissions of the PUSCH being scheduled to be transmitted across a fixed UL time unit set and a floating UL time unit set, a scrambling sequence used for the repeated transmissions of the PUSCH is initialized at a boundary between the fixed UL time unit set and the floating UL time unit set.

9. The UE according to claim 7, wherein based on the repeated transmissions of the PUSCH being scheduled to be transmitted across a fixed UL time unit set and a floating UL time unit set, a scrambling sequence is initialized every N PUSCH transmissions in the fixed UL time unit set and every M PUSCH transmissions in the floating UL time unit set, and N and M are different.

10. The UE according to claim 9, wherein transmission power of the fixed UL time unit is greater than transmission power of the floating UL time unit, and N is less than M.

11. The UE according to claim 8, wherein the PDCCH includes a narrowband PDCCH (NPDCCH), and the PUSCH includes a narrowband PUCCH (NPUCCH).

12. The UE according to claim 7, wherein the wireless communication system includes a wireless communication system supporting narrowband Internet of things (NB-IoT).

* * * * *